United States Patent
Kompella

(10) Patent No.: US 7,751,405 B1
(45) Date of Patent: Jul. 6, 2010

(54) AUTOMATIC CONFIGURATION OF LABEL SWITCHED PATH TUNNELS USING BGP ATTRIBUTES

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 434 days.

(21) Appl. No.: 11/861,780

(22) Filed: Sep. 26, 2007

(51) Int. Cl.
H04L 12/28 (2006.01)

(52) U.S. Cl. ............ 370/395.2; 370/254; 370/386; 370/389; 370/392; 370/397; 370/399; 370/400; 370/401; 370/409

(58) Field of Classification Search ........... 370/254, 370/386, 389, 392, 395.2, 397, 399, 400, 370/401, 409
See application file for complete search history.

(56) References Cited

U.S. PATENT DOCUMENTS 6,130,889 A * 10/2000 Feldman et al. ........... 370/397
2004/0090955 A1 * 5/2004 Berthaud et al. ........... 370/386
2008/0123651 A1 * 5/2008 Vasseur et al. ............ 370/392
2008/0130515 A1 * 6/2008 Vasseur .................... 370/254
2008/0307516 A1 * 12/2008 Levy-Abegnoli et al. ....... 726/9

* cited by examiner

*Primary Examiner*—William Trost, IV
*Assistant Examiner*—Toan D Nguyen
(74) *Attorney, Agent, or Firm*—Shumaker & Sieffert, P.A.

(57) ABSTRACT

Techniques are described for automatically establishing network tunnels among a set of routers. For example, the techniques allow a routing protocol, such as the Border Gateway Protocol (BGP), to be extended to generate routing advertisements that direct a receiving device to automatically establish a particular type of tunnel, e.g., a Resource Reservation Protocol with Traffic Engineering extensions (RSVP-TE) Label Switched Path (LSP), and automatically direct particular network traffic onto the tunnel. A method comprises receiving a routing advertisement from a network device, wherein the routing advertisement includes a destination reachable by the network device, and a tunnel attribute that specifies a type of network tunnel to be established to the network device for forwarding traffic to the destination, automatically establishing a network tunnel to the network device in accordance with the tunnel attribute, and forwarding network traffic to the destination using the established network tunnel.

21 Claims, 5 Drawing Sheets

AUTOMATIC CONFIGURATION OF LABEL SWITCHED PATH TUNNELS USING BGP ATTRIBUTES

TECHNICAL FIELD

The invention relates to computer networks and, more particularly, engineering traffic within computer networks.

BACKGROUND

Routing devices within a network, often referred to as routers, maintain tables of routing information that describe available routes through the network. Upon receiving an incoming packet, the router examines information within the packet and forwards the packet in accordance with the routing information. In order to maintain an accurate representation of the topology of the network, routers exchange routing information in accordance with a defined routing protocol, such as the Intermediate System-to-Intermediate System (IS-IS) protocol or the Open Shortest Path First (OSPF) protocol.

Multi-protocol Label Switching (MPLS) is a mechanism used to engineer traffic patterns within Internet Protocol (IP) networks. By utilizing MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute and establish LSPs within a network.

Numerous types of routers exist within the Internet. Network Service Providers (NSPs), for example, maintain "edge routers" that provide Internet access to customers. These provider edge (PE) routers may also provide additional services to customers, such as supporting Virtual Private Networks (VPNs). A VPN allows an enterprise to accomplish private connectivity between site networks over a public network, such as the Internet. In general, a VPN securely connects multiple customer networks using the public network, and ensures privacy by creating "tunnels" through the public network. The tunnels may be formed by one or more LSPs.

SUMMARY

In general, techniques are described for automatically establishing network tunnels. More specifically, the techniques allow a routing protocol, such as the Border Gateway Protocol (BGP), to be extended in a manner that allows the protocol to generate routing advertisements that operate as requests for the automatic establishment of a network tunnel. The routing protocol advertisement includes an attribute defined herein that enables a receiving device to automatically establish a particular type of network tunnel, e.g., a Resource Reservation Protocol with Traffic Engineering extensions (RSVP-TE) Label Switched Path (LSP) to the advertising device. Moreover, the receiving device may automatically update its forwarding plane to direct particular network traffic into the network tunnel so established. In this manner, the techniques may avoid extensive manual configuration requirements typically associated with setting up the RSVP-TE LSPs within a network, and with defining forwarding policies to direct traffic into these LSPs.

In accordance with the techniques described herein, a tunnel attribute is defined as a new attribute to be carried by routing protocol communications, such as BGP communications. For example, the tunnel attribute may be a newly defined type of path attribute to be carried within a BGP update message. The tunnel attribute may indicate a type of LSP tunnel to be set up as well as a profile that specifies required characteristics for the LSP tunnel, e.g., bandwidth or latency requirements. The BGP update message may specify the tunnel attribute in association with a particular destination, such as an Internet Protocol (IP) prefix, or a Layer 2 endpoint, a virtual private LAN service (VPLS) endpoint, or a Layer 3 virtual private network (VPN) endpoint, as an indication that a tunnel of the specified type is required for providing services to the destination. Another network device, such as another router, may receive the BGP update message and use the tunnel attribute in conjunction with other information found within the BGP update message to establish a network tunnel of a particular type having particular characteristics for sending the network traffic. For example, the router may use the tunnel attribute along with other path attributes of IP prefixes within a network layer reachability information (NLRI) field of the BGP update message. For example, the BGP update message may be modified to define a BGP community for the destination to which an LSP is needed, and the tunnel attribute may be specified with the attributes of the BGP community.

In one example, a provider edge (PE) router receives a routing advertisement from an origin customer network. The routing advertisement typically that specifies destination information associated with the customer network. Based on configuration information, the PE router coupled to the customer network determines the need for a network tunnel and outputs a routing advertisement having the tunnel attribute to effectively request automatic set up of one or more tunnels from other routers capable of sourcing the network tunnel. Other routers in the network, including PE routers, receive the routing advertisement and update stored routing information based on the routing advertisement. Subsequently, the PE routers perform path selection and may select the advertising router as the final hop for reaching the network destination. Any PE router that selects a path to the destination that terminates with the advertising router then commences automatic establishment of a tunnel of the specified type (e.g., an RSVP-TE LSP) to the advertising PE router.

In this manner, the PE router automatically establishes an RSVP-TE LSP tunnel for sending the traffic in accordance with the tunnel attribute received via the routing advertisement from the selected peer. For example, the PE router establishes the RSVP-TE LSP tunnel to conform to a profile specified by the tunnel attribute. In addition, the PE router automatically updates forwarding information to direct particular traffic (in this case, traffic to the origin customer network) onto the RSVP-TE LSP tunnel according to information contained within the routing advertisement. As a result, the PE router may ensure that particular types of traffic are forwarded along RSVP-TE LSP tunnels that conform to particular profiles suitable for the types of traffic.

In this way, RSVP-TE LSP tunnels having a certain profile may be automatically created within a network between peer PE routers. This may reduce the need for manual configuration of RSVP-TE LSP tunnels. Moreover, the technique makes use of existing routing protocol messages that are already present within the network, such as routing protocol advertisement messages are exchanged between routers to advertise topology changes, customer prefixes, and/or VPN endpoints. Although described for purposes of example with respect to BGP update messages, the techniques described herein may be applied to any routing protocol communications to which attributes may be attached. Further, although described for purposes of example with respect to a label switching protocol that accounts for constraint information and allocates resources when establishing LSPs, e.g., RSVP-TE, the techniques described herein may be applied to any technology to establish tunnels between a pair of routers. For example, the techniques may be applied to establishing tunnels that are neither label-switched nor constraint-based, such as Generic Route Encapsulation (GRE) tunnels, IP Security (IPSec) tunnels, or Layer 2 Tunneling Protocol (L2TP) tunnels.

The techniques described herein may provide one or more advantages. For example, the techniques described herein allow for LSP tunnels to be established between particular endpoints in a network using RSVP-TE without the requiring that a full mesh of LSP tunnels be configured within the network. As a result, is, only those LSP tunnels that will be used for carrying network traffic are created, and tunnels need not be necessarily created between all routers within the network. This may be especially advantageous in situations in which a full mesh of LSP tunnels is unnecessary. As one example, in a hub-and-spoke configuration in which one PE router will send video traffic to each of a plurality of other PE routers, LSP tunnels may be established between the video source PE router and each of the receiving PE routers. In this case, LSP tunnels need not be established among the receiving PE routers. Thus, the techniques described herein may be applied asymmetrically within a network. That is, a first PE router may send a message requesting to establish a tunnel to the first PE router and use the tunnel for a particular route. Peer PE routers will establish the tunnels if path selection indicates to use the first PE router for the particular route, regardless of whether the peer PE routers themselves have the particular route or need such a tunnel.

In contrast, other techniques for automating configuration of RSVP-TE LSPs may require that a full mesh of LSP tunnels be established even in situations where the full mesh is not needed. For example, one technique uses an Interior Gateway Protocol (IGP), such as the Intermediate System-to-Intermediate System (IS-IS) protocol and the Open Shortest Path First (OSPF) protocol, to send IGP messages advertising requests to establish LSPs having a particular profile. As another example, another technique uses a separate Address Family Identifier (AFI) to be included in a BGP announcement message advertising requests to establish LSPs having a particular profile. However, both of these techniques may result in the creation of a full mesh of RSVP-TE LSPs, because these techniques cannot be applied asymmetrically, as described above. Instead, these techniques are symmetric: a set of PEs each must want a tunnel having a particular type and profile; if not, the tunnels are not established; if so, a full mesh of tunnels is established. In addition, these techniques require additional messages to be introduced within the network for requesting that LSPs be established.

In one embodiment, a method comprises receiving a routing advertisement from a network device, wherein the routing advertisement includes a destination reachable by the network device, and a tunnel attribute that specifies a type of network tunnel to be established to the network device for forwarding traffic to the destination, and wherein the routing advertisement specifies available routes within the network in accordance with a routing protocol, automatically establishing a network tunnel to the network device in accordance with the tunnel attribute, and forwarding network traffic to the destination using the established network tunnel.

In another embodiment, a method comprises generating a routing advertisement with a network device that includes a destination reachable by the network device and a tunnel attribute that identifies a type of network tunnel to be established for forwarding traffic to the destination, and wherein the routing advertisement specifies available routes within the network in accordance with a routing protocol, outputting the generated routing advertisement to one or more peer network devices, receiving a request to initiate a network tunnel in accordance with the tunnel attribute, receiving data through the network tunnel, and forwarding the received data to the destination.

In a further embodiment, a routing device comprises an interface to receive a routing advertisement from a network device, wherein the routing advertisement includes a destination reachable by the network device and a tunnel attribute that specifies a type of network tunnel to be established to the network device for forwarding traffic to the destination, and wherein the routing advertisement specifies available routes within the network in accordance with a routing protocol, and a control unit to automatically establishing a network tunnel to the network device in accordance with the tunnel attribute, and forward network traffic to the destination via the interface using the established network tunnel.

In yet another embodiment, a computer-readable medium comprises instructions for causing a programmable processor to receive a routing advertisement from a network device, wherein the routing advertisement includes a destination reachable by the network device, and a tunnel attribute that specifies a type of network tunnel to be established to the network device for forwarding traffic to the destination, and wherein the routing advertisement specifies available routes within the network in accordance with a routing protocol, automatically establish a network tunnel to the network device in accordance with the tunnel attribute, and forward network traffic to the destination using the established network tunnel.

In another embodiment, a system comprises a first router that generates a routing advertisement that includes a destination reachable by the first router and a tunnel attribute that identifies a type of network tunnel and requests that other routers establish one or more network tunnels of the identified type to the first router as an egress for the network tunnels for forwarding traffic to the destination, wherein the routing advertisement specifies available routes within the network in accordance with a routing protocol. The system further comprises a second router that receives the routing advertisement from the first router, automatically establishes a network tunnel of the identified type in accordance with the tunnel attribute, wherein the second router establishes the network tunnel as an ingress for the established network tunnel, and forwards network traffic to the destination using the established network tunnel.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
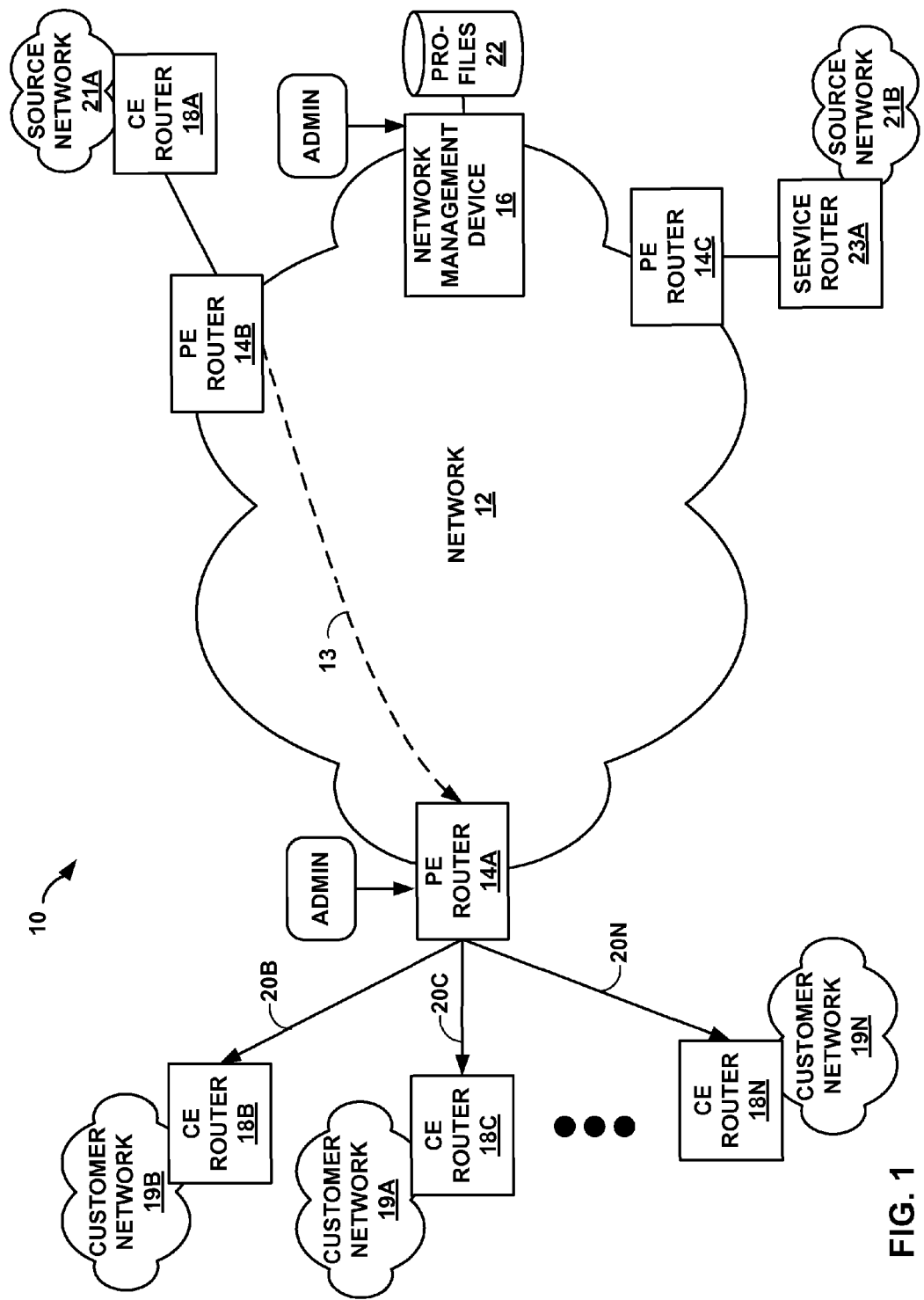
FIG. 1 is a block diagram illustrating a network environment in which provider edge routers support automatic configuration of RSVP-TE LSPs in accordance with the principles of the invention.

FIG. 1 is a block diagram illustrating an example system 10 in which provider edge (PE) routers 14A-14C ("PE routers 14") of network 12 support automatic configuration of tunnels in accordance with the principles of the invention. In the illustrated embodiment of FIG. 1, source networks 21A-21B ("source networks 21") provide services to customer networks 19A-19N ("customer networks 19"). For example, source networks 21 may provide voice services, video services, virtual private network (VPN) services, or other services to customer networks 19. PE routers 14 may forward traffic associated with the services across network 12. Network traffic associated with the services may be transported across network 12 through one or more tunnels 13, which are described for purposes of example as Resource Reservation Protocol with Traffic Engineering extensions (RSVP-TE) label switched paths (LSPs) tunnels. PE router 14A forwards the received traffic to customer edge (CE) routers 18A-18N ("CE routers 18"), which forward the traffic to respective customer network 19. Service router 23A provides access to various types of services, such as Internet or VPN peering, access services (such as DSLAMs and other forms of Layer 1 or Layer 2 access), content services and media services, including voice and video.

Customer networks 19 may include local area networks (LANs) or wide area networks (WANs) that comprise a plurality of customer devices (not shown). The customer devices may include personal computers, laptops, workstations, personal digital assistants (PDAs), wireless devices, network-ready appliances, file servers, print servers or other devices that access source networks 21 via network 12.

CE routers 18B-18N connect to PE router 14A via links 20B-20N ("links 20"). Links 20 may be digital subscriber lines, cables, T1 lines, T3 lines, or other network connections. CE routers 18 and PE routers 14 maintain routing information that describes available routes through system 10. Upon receiving an incoming packet, the routers 14, 18 examine information within the packet and forward the packet in accordance with the routing information. CE routers 18 may exchange routing information with PE routers 14 in accordance with one or more internal or external routing protocols. PE routers 14 may exchange routing information among themselves in accordance with one or more internal routing protocols. Exemplary internal routing protocols include the Interior Border Gateway Protocol (IBGP), the Routing Information Protocol (RIP), or the Open Shortest Path First (OSPF) protocol. Exemplary external routing protocols include the External Border Gateway Protocol (EBGP, in some instance EBGP is referred to simply as BGP), the Exterior Gateway Protocol (EGP), or the Inter-Domain Routing Protocol (IDRP).

In accordance with the techniques described herein, PE routers 14 communicate in accordance with a routing protocol that has been extended in a manner that allows PE routers 14 automatically establish RSVP-TE LSP tunnel 13. In particular, PE router 14A outputs routing advertisements to provide updated routing topology information. At this time, PE router 14 includes a tunnel attribute described herein that effectively operates to request a tunnel for sourcing network services (e.g., VoIP, video, audio) for customer networks 19. The tunnel attribute included within the routing advertisement identifies a type and characteristics of the type of service to be provided. In response, PE routers 14 capable of acting as sources for the requested services communicate with the requesting PE router communicate in accordance with a label switching protocol capable to automatically establish one or more tunnels in accordance with the tunnel attributes specified in the routing protocol messages. The techniques also allow PE routers 14 to automatically formulate the necessary network tunnels and automatically configure forwarding planes within the routers so as to direct particular types of traffic into the resulting tunnels.

For example, a routing protocol such as BGP may be extended so as to define a new path attribute, referred to herein as a "tunnel attribute," within a routing advertisement, e.g., a BGP update message. PE routers 14 may broadcast BGP update messages to exchange routing information, such as connectivity to customer networks or services. The techniques described herein allow PE routers 14 to use network reachability information conventionally specified in the BGP update messages in conjunction with the tunnel attribute to automatically establish network tunnels of a given type and direct particular network traffic into the network tunnels.

Network management device 16 is a central server device that maintains profiles 22. Profiles 22 define characteristics for setting up LSPs having particular attributes, and associate the characteristics with profile identifiers. An administrator may configure network management device 16 to define profiles 22 for different types of network services to be provided through network 12 by way of tunneled traffic. The profiles may indicate constraints associated with particular types of traffic, e.g., bandwidth constraints, latency constraints, and other constraints. For example, profiles 22 may specify a profile #1 for voice traffic with fast reroute protection; profile #2 for video traffic that requires high bandwidth and low latency; profile #3 for "best effort" traffic; and so on. In addition, profiles 22 may also specify whether a tunnel should be established as unidirectional (single LSP) or bidirectional (dual LSPs). In one embodiment, PE routers 14 may download the profile definitions from profiles 22, such that each of PE routers 14 maintains a globally identical copy of profiles 22. Alternatively, PE routers 14 may obtain the profile definitions as needed from network management device 16, and may not store a local copy.

In addition, an administrator may configure each of PE routers 14 to select on or more of the profiles based on the needs of customer networks 19. In this way, different PE routers 14 may be configured with different profiles, e.g., depending on the type of customers that the PE routers 14 are expected to service. For example, PE router 14A may be configured as requiring network services associated with profiles #1 and #3. In contrast, PE router 14C may be configured as requiring network services for profile #2. The PE routers 14 access network management device 16 to retrieve definitions for the designated profiles and output modified routing protocol communications to provide updated routing topology information as well as request automatic establishment of tunnels capable of providing the services.

In one example operation, PE router 14A may establish a routing protocol session, e.g., an IBGP session, with each of CE routers 18B-18N and receive routing advertisements from CE routers 18 that include routing information descriptive of destinations within customer networks 19. In accordance with IBGP, the routing advertisements utilize attributes associated with the originating customer networks 19. For example, PE router 14A may receive a routing advertisement from CE router 18B that identifies a new customer within customer network 19B as a destination for traffic. PE router 14A parses the routing advertisements to extract the routing information associated with the originating customer network 19 and updates the reachability information within its routing tables.

In addition, PE router 14A may broadcast one or more routing advertisements (e.g., BGP update messages) to peer routers, e.g., PE routers 14B and 14C. PE router 14A may form the routing advertisement to include some or all of the reachability information learned from CE router 18B. In addition, PE router 14A includes the tunnel attribute described herein to effectively request automatic set up of one or more tunnels from other routers that are capable of sourcing the network services for the customer. That is, PE router 14A announces that it wishes to be a termination point, i.e., egress router for a tunnel carrying the traffic for the particular service needed by the customer network 19. For example, the tunnel attribute included in the routing protocol advertisement by PE router 14A may specify a type and characteristics of an LSP tunnel to be automatically established within network 12 for providing video traffic to PE router 14A for delivery to the new video customer within customer network 19B. Upon receiving the routing advertisement, PE routers 14B and 14C may update stored routing information.

Based on the updated network topology within their routing information, PE router 14B performs path selection to select a path to the destination, e.g., customer network 19B. If there are multiple routers advertising paths to the destination, PE router 14B chooses from among peer routers advertising paths to the particular destinations. If PE router 14B selects a path to the destination that terminates with advertising PE router 14A as the final hop, then PE router 14 determines whether an RSVP-TE LSP of the requested type already exists from PE router 14B to PE router 14A. If not, PE router 14B commences automatic establishment of RSVP-TE LSP 13 of the specified type to the advertising PE router 14A.

For example, PE router 14B may select a path that terminates with PE router 14A as the final hop for delivery of the traffic to customer network 19B. In this case, PE router 14B determines whether RSVP-TE LSP 13 exists from PE router 14B to PE router 14A consistent with the tunnel attribute specified by the original routing advertisement received from PE router 14A. If not, PE router 14B initiates setup of RSVP-TE LSP 13 having a profile consistent with the tunnel attribute specified by the original routing advertisement During this automated process, PE router 14B may access configuration information to determine whether it is configured to operate as a source for the type of services associated with the specified RSVP-TE LSP and, therefore, should operate as an ingress for an LSP to the destination. In this example, PE router 14B determines that it is capable of providing the requested video service and that a RSVP-TE LSP 13 is needed to reach customer network 19B.

In addition, when PE router 14B performs path selection and establishes RSVP-TE LSP 13, PE router 14B may update internal forwarding information to direct particular traffic onto RSVP-TE LSP 13. For example, PE router 14B may update forwarding information within forwarding hardware of the router to direct traffic destined to the destination specified within by PE router 14A in the original BGP update message. The destination may identify an endpoint within customer network 19B that should receive the traffic via RSVP-TE LSP 13. Alternatively, the destination by be defined as a network prefix associated with customer network 19B and may, for example, be represented as a BGP community. After the RSVP-TE LSP 13 is established, PE router 14B may direct traffic along RSVP-TE LSP 13 based on forwarding information.

In this manner, the techniques allow for automatic configuration of network tunnels, e.g., RSVP-TE LSP tunnels, and cause particular traffic to be automatically directed onto the RSVP-TE LSP tunnels, based on attributes carried within routing advertisements. The techniques do not necessarily require that a full mesh of LSPs be created between the PE routers 14 of network 12. Instead, RSVP-TE LSP tunnels may be created only where necessary within network 12. Moreover, the techniques do not require injection of separate, standalone messages within network 12 to enable the automatic configuration of tunnels and direction of traffic onto the tunnels. That is, routing protocol messages already exchanged between PE routers 14A can be modified to initiate and control automatic creation of the LSPs.

In some embodiments, one or more intermediate routers (not shown in FIG. 1) may be present within network 12 between PE router 14A and PE routers 14B, 14C, in which case PE router 14A sends the routing advertisement to peer intermediate router(s), which then would ultimately be propagated to PE routers 14B, 14C. Nonetheless, for ease of description, PE router 14A is described as forwarding the routing advertisement to PE routers 14B, 14C.

Figure 2:
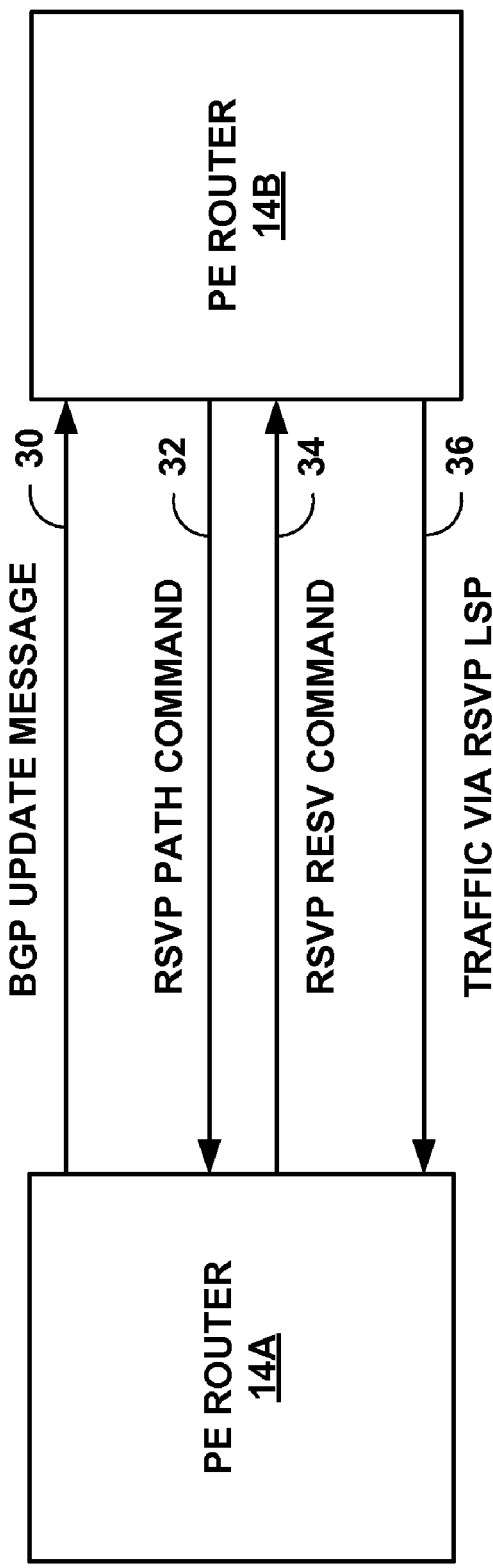
FIG. 2 is a block diagram illustrating example interactions between provider edge routers.

FIG. 2 is a block diagram illustrating example interactions between provider edge routers 14A and 14B of FIG. 1. In the example of FIG. 2, PE router 14A sends a routing advertisement, e.g., a BGP update message 30, to PE router 14B. For example, PE router 14A may broadcast the BGP update message 30 to a plurality of peer PE routers 14. PE router 14A may send the BGP update message 30 to exchange routing information with peer PE routers 14, such as updates to a routing table. For example, PE router 14A may send the BGP update message 30 to advertise a path to a destination in response to receiving a routing advertisement from one of CE routers 18B-18N via an IBGP session. BGP update message 30 may be triggered by a change in the topology of customer network 19B or network 12, or upon first establishment of a peering session between CE router 18B and PE router 14A. As described herein, BGP update message 30 includes a tunnel attribute within a path attributes field.

PE router 14B receives BGP update message 30 from PE router 14A. In one example, BGP update message 30 includes a prefix associated with a destination, e.g., customer network 19B and attaches a BGP community to the destination. PE router 14B may update stored routing information based on the BGP update message, including information associated with the BGP community, which includes the tunnel attribute define herein. Upon receiving the BGP update message 30, PE router 14B perform path selections to select a path for reaching the destination. In this example, PE router 14B selects a path that terminates with PE router 14A for reaching customer network 19A. PE router 14B then determines whether an RSVP-TE LSP of the appropriate type already exists starting at PE router 14B and terminating at PE router 14A for delivery of traffic for the network service(s) specified in the tunnel attribute of BGP update message 30. If not, PE router 14B may initiate setup of a tunnel to the selected peer router, i.e., PE router 14A, where the tunnel is of a type specified by the tunnel attribute. For example, the tunnel attribute may specify to set up an RSVP-TE LSP tunnel with certain bandwidth or latency requirements.

For example, PE router 14B may select PE router 14A as the best path to the advertised destination and may determine that an RSVP-TE LSP need be set up. In this case, PE router 14B sends an RSVP PATH command 32 to PE router 14A to initiate establishment of an RSVP-TE LSP in accordance with the tunnel attribute. The PATH command 32 may travel through intermediate routers (not shown in FIG. 1) along a path to PE router 14A. The PATH command may contain a flow ID that identifies the RSVP-TE session that is being set up, and provides information about the type of flow and its bandwidth requirements. When PE router 14A receives the PATH command 32, PE router 14A indicates willingness to participate in the RSVP-TE session by returning an RSVP RESV command 34 back to PE router 14B along the same route. As each of the intermediate routers along the route receives the RESV command, the intermediate routers will reserve the required bandwidth and respond with a similar RSVP RESV command. Once PE router 14B has received a RESV command 34, PE router 14B completes the setup of the RSVP-TE LSP between PE router 14B and PE router 14A. PE routers 14A and 14B may each update forwarding information within their respective forwarding planes (e.g., hardware dedicated to forwarding packets) to reflect the existence of the RSVP-TE LSP. In addition, PE router 14B may update its forwarding information to indicate that traffic to a particular destination, as specified by the original BGP update message 30, should be sent via the established RSVP-TE LSP tunnel. PE router 14B may then send traffic 36 to PE router 14A via the RSVP-TE LSP tunnel.

Figure 3:
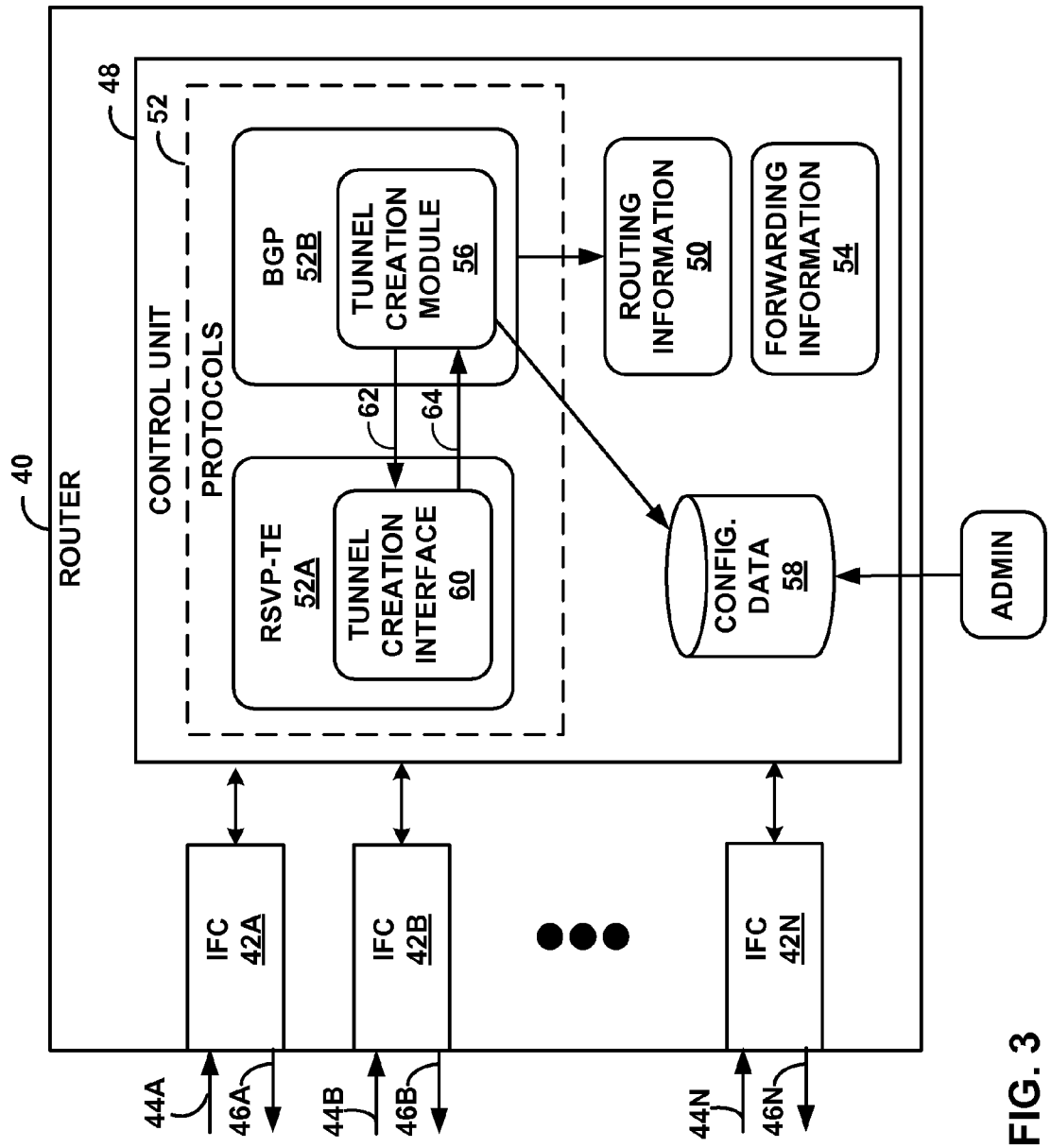
FIG. 3 is a block diagram illustrating an example embodiment of a router that supports automatic configuration of RSVP-TE LSPs in accordance with the principles of the invention.

FIG. 3 is a block diagram illustrating an example embodiment of a router 40 that supports automatic configuration of RSVP-TE LSPs in accordance with the principles of the invention. Router 40 may be a PE router such as one of PE routers 14 of FIG. 1. In the exemplary embodiment illustrated in FIG. 3, router 40 includes interface cards (IFCs) 42A-42N ("IFCs 42") for communicating packets via inbound links 44A-44N ("inbound links 44") and outbound links 46A-46N ("outbound links 46"). IFCs 42 are coupled to inbound links 44 and outbound links 46 via a number of interface ports (not shown).

Router 40 further comprises a control unit 48 that maintains routing information 50. In general, when router 40 receives a packet via one of inbound links 44, control unit 48 determines a destination and associated next hop for the packet in accordance with forwarding information 54 and forwards the packet on an outbound link 46 based on the destination or on the label that the packet carries.

Specifically, control unit 48 maintains routing information 50 describes the topology of a network, such as network 12 of FIG. 1, and, in particular, routes through network 12. Routing information 50 may include, for example, route data that describes various routes within a network and corresponding next hop data indicating appropriate neighboring devices within the network for each of the routes, as well as labels that will be applied to the traffic. Control unit 48 performs path selection, i.e., selects between the various paths through the network, and generates forwarding information 54 in accordance with routing information 50. Forwarding information 54 may associate network destinations with specific next hops and corresponding interface ports. Router 40 receives routing communications from other routers, updates routing information 50 to accurately reflect the topology of the network in accordance with the routing communications and regenerates forwarding information 54 based on the selected paths. Each of the routing communication conforms to a routing protocol, such as an IGP or an external gateway protocol (EGP), or to a label distribution protocol, such as LDP or RSVP-TE.

Control unit 48 provides an operating environment for protocols 52A-52B (collectively, "protocols 52") executing within control unit 48. In this example, protocols 52 include a resource reservation protocol 52A ("RSVP-TE 52A") and a border gateway protocol 52B ("BGP 52B"). RSVP-TE 52A receives resource reservation requests from other routing devices, and reserves the requested bandwidth on outbound links 46 for RSVP-TE traffic. RSVP-TE 52A tracks the bandwidth reservation requests in order to maintain accurate bandwidth availability information.

BGP 52B comprises a border gateway protocol that has been extended to define a new path attribute (referred to as a "tunnel attribute") for use in automatically establishing tunnels as described herein. In some embodiments, BGP 52B may comprise separate IBGP and EBGP modules, for communication with CE routers 18 and peer PE routers 14, respectively.

An administrator may configure configuration data 58 ("CONFIG. DATA 58") to specify one or more profiles associated with types of services provided by router 40. For example, if router 40 services customer networks that require video services, the administrator may configure configuration data 58 to specify "Profile #2", which may be defined within network management device 16 to correspond to high bandwidth and low latency constraints for video traffic.

As one example, control unit 48 may receive a routing advertisement via BGP 52B from an origin customer network 19 (i.e., from one of CE routers 18). For example, the routing advertisement may specify an Internet Protocol (IP) prefix. Control unit 48 updates routing information 50 and formats a BGP update message in accordance with BGP 52B to advertise itself as providing a path to the IP prefix. In addition, a tunnel creation module 56 within BGP 52B includes a tunnel attribute within the BGP update message that serves as a request to any recipient of the BGP update message that an RSVP-TE LSP tunnel is needed that terminates at router 40 and conforms to a particular profile. Tunnel creation module 56 references configuration data 58 when adding the tunnel attribute, and may set a profile in a profile field of the tunnel attribute in accordance with configuration data 58. For example, the routing advertisement advertises a path to an IP prefix that is designated as requiring video services, tunnel creation module 56 may set the profile field to reflect Profile #2 to request a tunnel for carrying video traffic. Router 40 outputs the BGP update message via one or more of outbound links 46. For example, router 40 may broadcast the BGP update message to one or more peer PE routers 14 within network 12. In this manner, router 40 may initiate the automatic set up of an LSP for which router 40 operates as an egress so as to receive traffic from the LSP and provide the traffic to a customer network.

In another example, router 40 may operate as an ingress router and automatically set up an LSP from router 40 to a different peer router 14. In this example, control unit 48 may receive a BGP update message via BGP 52B from a peer PE router 14. In this case, the BGP update message may advertise a route to a particular destination, e.g., an IP prefix, and includes a tunnel attribute specifying a type of LSP associated with the destination. BGP 52B may parse the path attributes of the received BGP update message and identify a tunnel attribute as one of the path attributes. Control unit 48 may store information contained within the received BGP update message, e.g., information associating the tunnel attribute with the IP prefix and the peer PE router 14A. For example, control unit 48 may update routing information 50 to correctly reflect the topology of the network, including the advertised routes to the destination, and may include the tunnel attribute specifying the type of LSPs that should automatically be established to the advertising peer capable of reaching the destination.

Subsequently, router 40 processes the updated routing information 50 and performs path selection to choose from among a plurality of paths to the newly identified destination. For example, router 40 may need to forward traffic from one of source networks 21 to the destination, and selects among the available routes for reaching the destination, as represented by routing information 50. Upon selecting a route, tunnel creation module 56 references routing information 50 to determine whether the final hop of the path is a router from which a tunnel attribute was received with the router advertised its route to the destination. If so, tunnel creation module 56 initiates automatic establishment of an RSVP-TE LSP from router 40 to the router selected as the final hop along the path to the destination.

More specifically, when tunnel creation module 56 determines that the peer router selected as the final hop for reaching the destination has advertised the destination in association with a specific tunnel attribute, tunnel creation module 56 invokes tunnel creation interface 60 of RSVP-TE 52A via an inter-process message 62 to initiate creation of an RSVP-TE LSP tunnel in accordance with a profile specified within the tunnel attribute. For example, tunnel creation interface 60 may operate in accordance with RSVP-TE 52A to traffic engineer the computed best path and initiate setup of the RSVP-TE LSP tunnel by sending a PATH command to the peer router selected as the final hop to the destination. RSVP-TE 52A may receive a RSVP RESV command from the selected peer router (or an intermediate router) in response to the RSVP PATH command. Tunnel creation interface 60 may inform tunnel creation module 56 that setup of the RSVP-TE LSP tunnel is complete via a second inter-process message 64. BGP 52B may update routing information 50 and/or forwarding information 54 to reflect the presence of the newly established RSVP-TE LSP tunnel starting at router 40 and terminating with the selected peer router for providing traffic to the destination. In addition, BGP 52B may update forwarding information 54 within a forwarding plane (e.g., forwarding engine) to specify particular traffic bound for the destination is to be routed onto the newly established RSVP-TE LSP tunnel. In particular, BGP 52B may specify that traffic destined to the IP prefix should be encapsulated as MPLS packets and forwarded along the RSVP-TE LSP tunnel until ultimately reaching the selected peer router, where the MPLS header is removed and the traffic is provided to the destination.

In this manner, upon selecting a path for reaching a destination, router 40 automatically establishes an RSVP-TE LSP tunnel to the peer router at the final hop of the path for sending the traffic in accordance with a tunnel attribute previously received from that peer router via a routing advertisement. For example, router 40 establishes the RSVP-TE LSP tunnel to conform to a profile specified by the tunnel attribute. In addition, router 40 automatically updates forwarding information 54 to direct particular traffic onto the RSVP-TE LSP tunnel according to information contained within the routing advertisement. As a result, router 40 may ensure that particular types of traffic are forwarded along RSVP-TE LSP tunnels that conform to particular profiles suitable for the types of traffic.

In this way, RSVP-TE LSP tunnels having a certain profile may be automatically created within network 12 between peer PE routers 14. This may reduce the need for manual configuration of RSVP-TE LSP tunnels. Moreover, because a PE router only creates RSVP-TE LSPs to those PE routers that it has selected as final hops for reaching destinations associated with a requested type of tunnel, the techniques may avoid creating an unneeded full mesh of RSVP-TE LSPs between all of the PE routers within network 12. Although described for purposes of example with respect to BGP update messages, the techniques described herein may be applied to any routing advertisements to which attributes may be attached. Further, although described for purposes of example with respect to RSVP-TE, the techniques described herein may be applied to any label switching protocol that accounts for constraint information, e.g., by allocating resources, when establishing LSPs.

In some cases, router 40 may receive multiple routing advertisements each having the same tunnel attribute from a peer router, but each relating to a different customer. In other words, router 40 may receive multiple requests to establish an RSVP-TE LSP tunnel matching the same profile. In this situation, router 40 may be configured with a policy (e.g., within configuration data 58) whether to create a single, larger RSVP-TE LSP (i.e., having a greater bandwidth allocation) to the peer router, or whether to create multiple separate RSVP-TE LSPs to the peer router. Router 40 may maintain a reference count for a particular RSVP-TE LSP, and control unit 48 may increment the count each time router 40 adds traffic associated with a different customer to the RSVP-TE LSP in response to receiving a routing advertisement having the same tunnel attribute from the same peer router that operates as the egress for the RSVP-TE LSP.

In some situations, router 40 may receive a BGP update message from another router that includes a request to withdraw one or more routes. For example, the BGP update message may indicate that a particular destination is no longer reachable, which may be the case when a video customer coupled to the advertising router is no longer available and, therefore, no longer requires video traffic. In this case, control unit 48 may decrement the stored reference count associated with an RSVP-TE LSP matching the video profile and formed from router 40 to the advertising router. In some embodiments, the BGP update message for the withdrawal may include the tunnel attribute, and in other embodiments the BGP update message for the withdrawal may not include a tunnel attribute. When the message for the withdrawal does not include the tunnel attribute, router 40 may maintain state information by which router 40 knows that traffic for the particular video customer was being sent through a particular RSVP-TE LSP tunnel. In some embodiments, router 40 may tear down the current RSVP-TE LSP and create a smaller RSVP-TE LSP (i.e., having a lower bandwidth allocation) to the advertising router to reflect the change in bandwidth demand placed on the LSP. Alternatively, router 40 may output one or more messages informing intermediate routers associated with the LSP to reduce the allotted resources.

When all of the customers associated with a particular RSVP-TE LSP tunnel have been withdrawn, router 40 may tear down the RSVP-TE LSP tunnel. In some embodiments, router 40 may wait a predefined time period after receiving a request to withdraw before tearing down the RSVP-TE LSP tunnel. If router 40 receives another BGP update message within the time period for a customer that would use the RSVP-TE LSP tunnel already in existence, router 40 may not tear down the RSVP-TE LSP tunnel. This may allow router 40 to avoid unnecessary tear-down and establishment of RSVP-TE LSP tunnels.

The architecture of router 40 illustrated in FIG. 3 is shown for exemplary purposes only. In other embodiments, router 40 may be configured in a variety of ways. In one embodiment, for example, control unit 48 and its corresponding functionality may be distributed within IFCs 42. In another embodiment, control unit 48 may include a routing engine that performs route resolution and maintains a routing information base (RIB), e.g., routing information 50, and a forwarding engine that performs packet forwarding based on a forwarding information base (FIB), e.g., forwarding information 54, generated in accordance with the RIB.

Control unit 48 may be implemented in hardware, or may be implemented as a combination of hardware and firmware. For example, control unit 48 may include one or more processors which execute software instructions. In that case, the various software modules of control unit 48, such as protocols 52, may comprise executable instructions stored on a computer-readable medium, such as computer memory or hard disk.

In general, the functionality described in reference to control unit 48 may be implemented as executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. Moreover, the functionality may be implemented by executing the instructions of the computer-readable medium with one or more processors, discrete hardware circuitry, firmware, software executing on a programmable processor, or a combination of any of the above.

Figure 4:
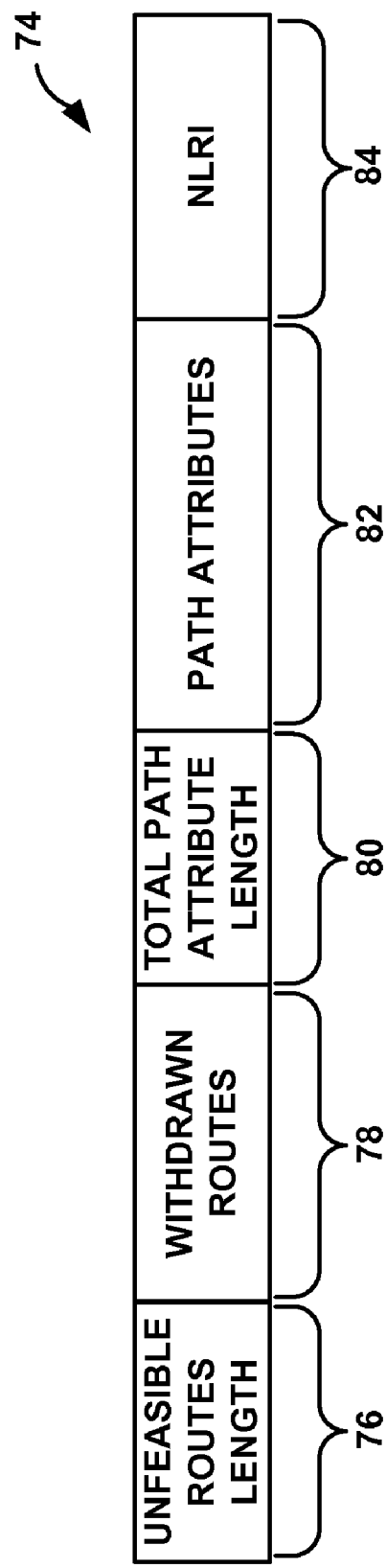
FIG. 4 is a block diagram illustrating an example BGP update message format.

FIG. 4 is a block diagram illustrating an example BGP update message 74. BGP update message 74 may be used to transfer routing information between BGP peers. For example, BGP update message 74 may be used to advertise a single feasible route to a peer, or to withdraw multiple unfeasible routes from service. BGP update message 74 includes a fixed-size BGP header (not shown), and may also include an unfeasible routes length field 76, a withdrawn routes field 78, a total path attribute length field 80, a path attributes field 82, and a network layer reachability information (NLRI) field 84.

Unfeasible routes length field 76 is a 2-octet unsigned integer that indicates a total length of withdrawn routes field 78 in octets. The value of unfeasible routes length field 76 must allow the length of NLRI field 84 to be determined as specified below. Withdrawn routes field 78 is a variable length field that contains a list of IP address prefixes for routes that are being withdrawn from service. Each IP address prefix may be encoded as a 2-tuple of the form <length, prefix>. Total path attribute length field 80 may be a 2-octet unsigned integer that indicates the total length of path attributes field 82 in octets. The value of total path attribute length field 80 must allow the length of NLRI field 84 to be determined as specified below. A value of zero within total path attribute length field 80 indicates that no NLRI field 84 is present in BGP update message 74.

Path attributes field 82 is a variable length sequence of path attributes. Path attributes may be a triple of the form <attribute type, attribute length, attribute value> of variable length. The attribute type field may be a two-octet field that consists of an attribute flags octet and an attribute code octet. The attribute flags octet may include bits that define whether the attribute is optional or well-known, transitive or non-transitive, partial or complete, and other information. The attribute code octet contains the attribute type code that indicates the type of path attribute. Path attributes may be used with different types of BGP NLRIs, e.g., NLRIs for virtual private LAN service (VPLS), virtual private networks (VPNs), layer two (L2) VPNs, Internet Protocol version Four (IPv4), IPv6, and the like.

In accordance with the techniques described herein, path attributes field 82 may include a newly defined path attribute, referred to herein as a "tunnel attribute." The tunnel attribute may, for example, be defined as an optional BGP path attribute, e.g., an optional transitive BGP path attribute. As a result, routers and other network devices that do not support the extension may ignore the tunnel attribute but will still accept the path and pass the update with the tunnel attribute along to other BGP peers. In one example embodiment, the tunnel attribute may include an attribute type that identifies the attribute as a tunnel attribute; the attribute value may consist of a type of tunnel to be created, and a profile number. As one example, the attribute value field of the tunnel attribute may be formatted as follows: <tunnel type, profile identifier>. The profile may specify certain constraints or parameters appropriate for particular types of traffic.

NLRI field 84 may be a variable length field that contains a list of IP address prefixes. The length in octets of NLRI field 84 is not coded explicitly, but may be calculated as: update message length minus 23 minus total path attributes length minus unfeasible routes length, where update message length is a value encoded in the fixed-size BGP header. NLRI field 84 may be encoded as one or more 2-tuples of the form <length, prefix>. The length field indicates the length in bits of the IP address prefix. A length of zero indicates a prefix that matches all IP addresses (with a prefix itself of zero octets). The prefix field contains IP address prefixes. NLRI field 84 can also contain reachability information for Layer 2 VPNs, Layer 3 VPNs or VPLS.

BGP update message 74 can advertise at most one route, which may be described by several path attributes. All path attributes contained in BGP update message 74 apply to the destinations carried in NLRI field 84 of BGP update message 74. BGP update message 74 can list multiple routes to be withdrawn from service. In some cases, BGP update message 74 may include both a route advertisement and withdrawn routes. Alternatively, BGP update message 74 may advertise only routes to be withdrawn from service, in which case it may not include path attributes field 82 or NLRI field 84. Conversely, BGP update message 74 may advertise only a feasible route, in which case withdrawn routes field 78 need not be present.

Figure 5:
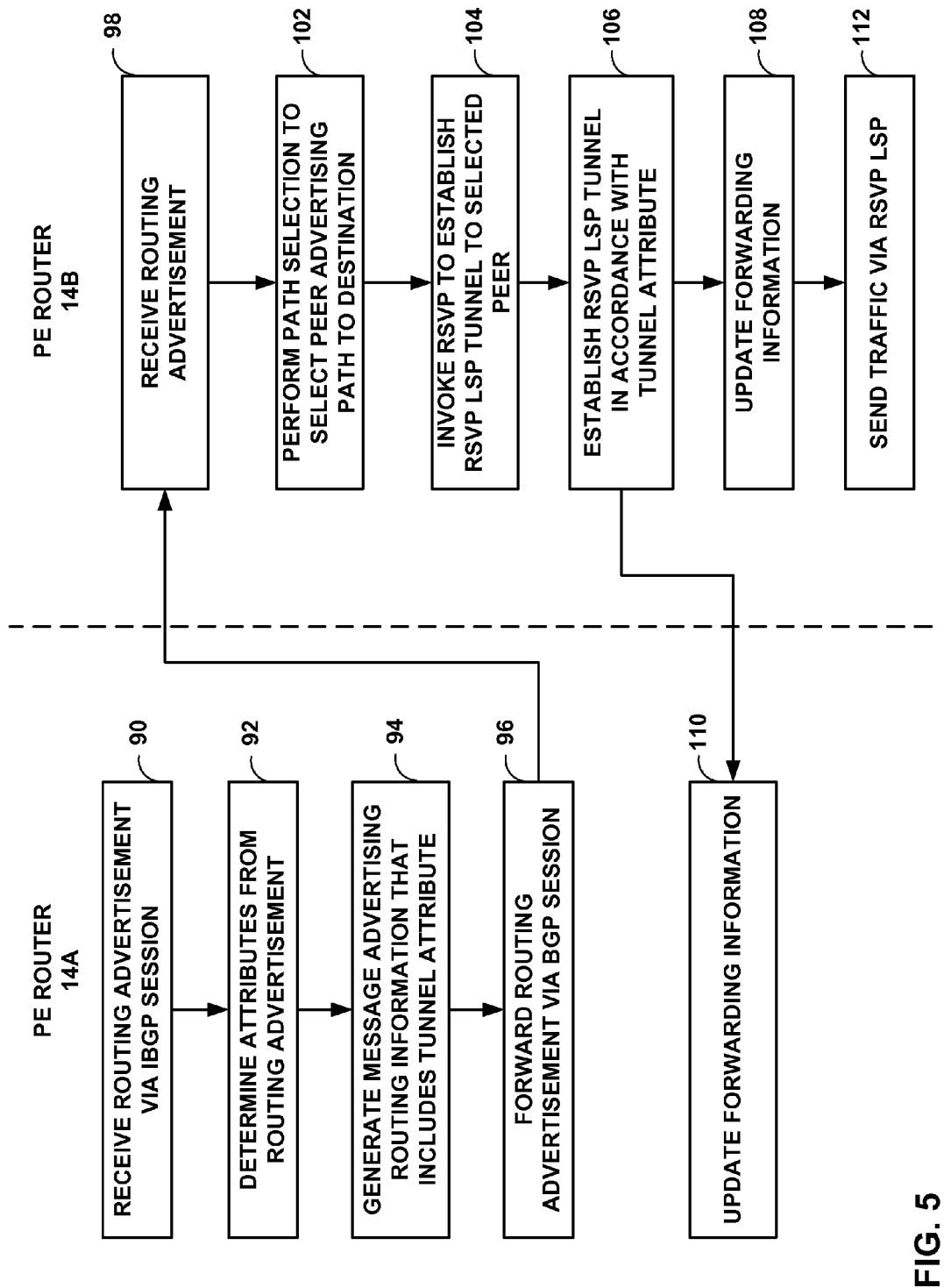
FIG. 5 is a flowchart illustrating exemplary operation of network devices, e.g., PE routers, that utilize an extended routing protocol in accordance with the principles of the invention.

FIG. 5 is a flowchart illustrating exemplary operation of network devices, e.g., PE routers, that utilize an extended routing protocol and an extended resource reservation protocol in accordance with the principles of the invention. In particular, FIG. 5 illustrates exemplary operation of the PE routers in exchanging routing advertisements and automatically setting up an RSVP-TE LSP in accordance with a tunnel attribute contained in the routing advertisements. For exemplary purposes, the PE routers are discussed in reference to PE routers 14A and 14B (FIG. 1).

Initially, PE router 14A establishes a routing protocol session, e.g., an IBGP session, with CE router 18B of customer network 19 to which PE router 14A is coupled. In the course of this session, PE router 14A learns of destinations within customer network 19B, typically by way of receiving routing advertisements from CE router 18A that includes routing information. In accordance with BGP, this routing advertisement utilizes attributes associated with the originating customer network 19B (90). PE router 14A parses the routing advertisement to extract the routing attributes associated with the originating customer network 19B (92).

PE router 14A then generates a message to inform peer PE routers, including PE router 14B, that it is capable of reaching destinations associated with customer network 19B. For example, PE router 14A may generate a BGP update message in accordance with the BGP protocol to advertise routing information, e.g., a path indicating PE router 14A is a final hop along a path to an IP prefix associated with customer network 19B. In addition, the BGP protocol is extended as described herein to allow PE router 14A to include a tunnel attribute within a path attributes field of the BGP update message to specify one or more types of RSVP-TE LSPs that should be formed so as to terminate with PE router 14A as an egress for delivering traffic to the specified destination (94). As one example, PE router 14A may broadcast a BGP update message to PE routers 14B, 14C that includes a tunnel attribute having an attribute value field of <Type=RSVP-TE, Profile=4>. PE router 14A forwards the BGP update message to PE router 14B (96).

PE router 14B receives the routing advertisement from PE router 14A (98). PE router 14B may update routing information 50 based on the BGP update message, and may also store information associating the tunnel attribute with the IP prefix and the peer PE router 14A from which the advertisement was received. This information may be stored within configuration information 58 or routing information 50. Subsequently, PE router 14B may perform path selection to choose from among routes received from peer routers for reaching the IP prefix (102). For example, PE router 14B may provide services from one of source networks 21 to the IP prefix, and may select a route having PE router 14A as the final hop for reaching the destination. Upon selecting the path received from PE router 14A, tunnel creation module 56 may reference stored information, e.g., routing information 50 or configuration data 58, and discover the tunnel attribute associated with the selected peer router.

Tunnel creation module 56 of BGP module 52B running on PE router 14B then invokes tunnel creation interface 60 of RSVP-TE module 52A also running on PE router 14B to initiate setup of an RSVP-TE LSP tunnel in accordance with the tunnel attribute (104).

For example, as described above with respect to FIG. 2, RSVP-TE module 52A executing on PE router 14B may send a PATH command 32 to PE router 14A in accordance with the tunnel attribute. In response, an RSVP-TE module 52A executing on PE router 14A indicates willingness to participate in the RSVP-TE session by returning a RESV command 34 to PE router 14B. In this manner, PE routers 14A, 14B establish an LSP tunnel of a certain type in accordance with the profile specified by the tunnel attribute of the initial BGP update message (106).

PE routers 14A and 14B may each update respective stored forwarding information 54 to reflect the existence of the newly created RSVP-TE LSP (108, 110). In particular, as an ingress to the newly formed LSP, PE router 14B updates its forwarding information to indicate that traffic destined to the IP prefix should be encapsulated as MPLS traffic and sent via the established RSVP-TE LSP to PE router 14A. Similarly, as an egress to the LSP, PE router 14A updates its forwarding information to indicate that MPLS traffic from the LSP should be extracted to produce IP traffic and forwarded to the CE router 18B. PE routers 14A and 14B may then forward traffic destined to the IP prefix via the RSVP-TE LSP (112).

Various embodiments of the invention have been described. These and other embodiments are within the scope of the following claims.

The invention claimed is:

1. A method comprising:
   receiving a routing advertisement from a network device, wherein the routing advertisement includes a destination reachable by the network device, and a tunnel attribute that specifies a type of network tunnel to be established to the network device for forwarding traffic to the destination, and wherein the routing advertisement specifies available routes within a network in accordance with a routing protocol;
   automatically establishing a network tunnel to the network device in accordance with the tunnel attribute;
   forwarding network traffic to the destination using the established network tunnel;
   maintaining a reference count for the established network tunnel;
   incrementing the reference count when network traffic associated with another destination is added to the established network tunnel in response to receiving subsequent routing advertisements having the same tunnel attribute from the same network device;
   receiving a routing advertisement that includes a request to withdraw a route associated with the established network tunnel;
   decrementing the reference count based on the request; and
   when the reference count is zero, tearing down the network tunnel.

2. The method of claim 1, further comprising:
   performing path selection to select the network device as a final hop for delivery of the network traffic from among a plurality of network devices each advertising a path to the destination; and
   accessing routing information to determine whether a network tunnel already exists to the network device in accordance with the tunnel attribute,
   wherein automatically establishing the network tunnel to the network device comprises automatically establishing the network tunnel upon determining that the network tunnel does not already exist to the network device in accordance with the tunnel attribute.

3. The method of claim 1, wherein receiving the routing advertisement comprises receiving a Border Gateway Protocol (BGP) update message, and wherein the tunnel attribute comprises a path attribute within the BGP update message.

4. The method of claim 1, wherein automatically establishing the network tunnel comprises automatically establishing the network tunnel using a label switching protocol that allocates resources when automatically establishing the network tunnel.

5. The method of claim 4, wherein the label switching protocol comprises a Resource Reservation Protocol with Traffic Engineering extensions (RSVP-TE), and wherein the network tunnel comprises an RSVP-TE label switched path (LSP).

6. The method of claim 1, further comprising automatically updating forwarding information to direct the network traffic destined for the destination onto the network tunnel.

7. The method of claim 1,
   wherein the type of network tunnel identifies a type of network protocol to be used for establishing the network tunnel, wherein the tunnel attribute further specifies a profile indicating characteristics for the network tunnel that are suitable for a type of traffic to be forwarded to the destination, and wherein automatically establishing the network tunnel to the network device in accordance with the tunnel attribute comprises automatically establishing a network tunnel having the characteristics using the type of network protocol.

8. The method of claim 1, further comprising waiting a time period before tearing down the network tunnel, and leaving the network tunnel intact if the reference count is non-zero within the time period.

9. A method comprising:
generating a routing advertisement with a first network device that includes a destination reachable by the first network device and a tunnel attribute that identifies a type of network tunnel to be established for forwarding traffic to the destination, wherein the routing advertisement specifies available routes within a network in accordance with a routing protocol;
outputting the generated routing advertisement to one or more peer network devices;
receiving the routing advertisement from the network device with a second network device;
automatically establishing a network tunnel of the identified type in accordance with the tunnel attribute with the second network device, wherein establishing the network tunnel comprises establishing the network tunnel with the second network device as an ingress for the established network tunnel;
receiving a request from a second network device for establishing the network tunnel in accordance with the tunnel attribute;
receiving data through the network tunnel;
forwarding the received data to the destination,
incrementing a reference count maintained by the second network device for the established network tunnel when network traffic associated with another destination is added to the established network tunnel in response to receiving subsequent routing advertisements having the same tunnel attribute from the first network device;
receiving a routing advertisement with the second network device that includes a request to withdraw a route associated with the established network tunnel and, in response, decrementing the reference count based on the request; and
when the reference count is zero, tearing down the network tunnel.

10. The method of claim 9, wherein generating the routing advertisement comprises generating the routing advertisement in response to receiving a routing advertisement from a third network device, wherein the received routing advertisement includes a destination reachable by the third network device.

11. The method of claim 9, wherein generating the routing advertisement comprises generating the routing advertisement in response to a policy defined by an administrator.

12. A routing device comprising:
an interface to receive a routing advertisement from a network device, wherein the routing advertisement includes a destination reachable by the network device and a tunnel attribute that specifies a type of network tunnel to be established to the network device for forwarding traffic to the destination, and wherein the routing advertisement specifies available routes within a network in accordance with a routing protocol; and a control unit to automatically establishing a network tunnel to the network device in accordance with the tunnel attribute, and forward network traffic to the destination via the interface using the established network tunnel, wherein the control unit maintains a reference count for the established network tunnel, and increments the reference count when network traffic associated with another destination is added to the established network tunnel in response to receiving subsequent routing advertisements having the same tunnel attribute from the same network device, wherein when the interface receives a routing advertisement that includes a request to withdraw a route associated with the established network tunnel, the control unit decrements the reference count based on the request.

13. The routing device of claim 12, wherein the control unit performs path selection to select the network device as a final hop for delivery of the network traffic from among a plurality of network devices each advertising a path to the destination, accesses routing information to determine whether a network tunnel already exists to the network device in accordance with the tunnel attribute, and automatically establishes the network tunnel upon determining that a network tunnel does not already exist to the network device in accordance with the tunnel attribute.

14. The routing device of claim 12, further comprising a Border Gateway Protocol (BGP) module executing within the control unit to examine the routing advertisement, wherein the tunnel attribute comprises a path attribute within a BGP update message.

15. The routing device of claim 14, further comprising a Resource Reservation Protocol with Traffic Engineering extensions (RSVP-TE) module executing within the control unit that establishes the network tunnel as an RSVP-TE label switched path (LSP).

16. The routing device of claim 15, wherein the BGP module includes a tunnel creation module, and wherein the RSVP-TE module includes a tunnel creation interface, wherein the tunnel creation module of the BGP module invokes the tunnel creation module of the RSVP-TE module to automatically establish the RSVP-TE LSP in accordance with the tunnel attribute.

17. The routing device of claim 14, wherein the BGP module automatically updates forwarding information to direct the network traffic destined for the destination onto the network tunnel.

18. The routing device of claim 14,
wherein the BGP module generates a BGP update message that includes the tunnel attribute as a path attribute, and the destination as an Internet Protocol (IP) prefix associated with a customer network device reachable by the network device,
wherein the type of network tunnel specified by the tunnel attribute identifies a type of network protocol to be used for establishing the network tunnel, and
wherein the tunnel attribute further specifies a profile indicating characteristics for the network tunnel that are suitable for a type of traffic to be forwarded to the destination.

19. A non-transitory computer-readable medium encoded with instructions comprising instructions for causing a programmable processor to:
receive a routing advertisement from a network device, wherein the routing advertisement includes a destination reachable by the network device, and a tunnel attribute that specifies a type of network tunnel to be established to the network device for forwarding traffic to the destination, and wherein the routing advertisement specifies available routes within a network in accordance with a routing protocol;

automatically establish a network tunnel to the network device in accordance with the tunnel attribute;

forward network traffic to the destination using the established network tunnel;

maintain a reference count for the established network tunnel;

increment the reference count when network traffic associated with another destination is added to the established network tunnel in response to receiving subsequent routing advertisements having the same tunnel attribute from the same network device;

receive a routing advertisement that includes a request to withdraw a route associated with the established network tunnel;

decrement the reference count based on the request; and when the reference count is zero, tear down the network tunnel.

20. The non-transitory computer-readable medium of claim 19, wherein the instructions cause the processor to automatically update forwarding information to direct network traffic destined for the destination onto the network tunnel.

21. A system comprising:

a first router that generates a routing advertisement that includes a destination reachable by the first router and a tunnel attribute that identifies a type of network tunnel and requests that other routers establish one or more network tunnels of the identified type to the first router as an egress for the network tunnels for forwarding traffic to the destination, wherein the routing advertisement specifies available routes within a network in accordance with a routing protocol; and a second router that receives the routing advertisement from the first router, automatically establishes a network tunnel of the identified type in accordance with the tunnel attribute, wherein the second router establishes the network tunnel as an ingress for the established network tunnel, and forwards network traffic to the destination using the established network tunnel, wherein the second router maintains a reference count for the established network tunnel, incrementing the reference count when network traffic associated with another destination is added to the established network tunnel in response to receiving subsequent routing advertisements having the same tunnel attribute from the same network device, and wherein the second router receives a routing advertisement that includes a request to withdraw a route associated with the established network tunnel, decrements the reference count based on the request, and, when the reference count is zero, tears down the network tunnel.

* * * * *